(12) United States Patent
Thomas et al.

(10) Patent No.: US 11,941,444 B2
(45) Date of Patent: Mar. 26, 2024

(54) FACILITATING SCHEDULING OF STORAGE SYSTEM PODS ON NODES OF A CLUSTER BASED ON DISCOVERY OF LOCAL BLOCK DEVICES ASSOCIATED WITH THE NODES

(71) Applicant: Hewlett Packard Enterprise Development LP, Houston, TX (US)

(72) Inventors: Skyler Thomas, Santa Clara, CA (US); Mark A. Tomas, Ft. Collins, CO (US); Scott Frolich, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 418 days.

(21) Appl. No.: 17/458,932

(22) Filed: Aug. 27, 2021

(65) Prior Publication Data

US 2023/0060766 A1 Mar. 2, 2023

(51) Int. Cl.
*G06F 9/50* (2006.01)
(52) U.S. Cl.
CPC ................... *G06F 9/5016* (2013.01)
(58) Field of Classification Search
None
See application file for complete search history.

(56) References Cited

U.S. PATENT DOCUMENTS

| | | | |
|---|---|---|---|
| 10,454,789 B2 | 10/2019 | Degioanni | |
| 10,698,733 B1 | 6/2020 | Lee et al. | |
| 10,824,726 B1 | 11/2020 | Saffar et al. | |
| 10,841,226 B2 | 11/2020 | Mariappan et al. | |
| 2014/0344810 A1* | 11/2014 | Wang | G06F 9/5072 718/1 |
| 2018/0025152 A1* | 1/2018 | Ben Ali | G06F 21/6281 726/22 |
| 2018/0300348 A1* | 10/2018 | Rao | G06F 21/53 |
| 2019/0163388 A1* | 5/2019 | Chen | G06F 9/45558 |
| 2020/0034240 A1 | 1/2020 | Natanzon et al. | |
| 2020/0034254 A1 | 1/2020 | Natanzon | |
| 2020/0136908 A1 | 4/2020 | Herce | |
| 2020/0228402 A1 | 7/2020 | Parker | |
| 2020/0249994 A1 | 8/2020 | Drivnak | |
| 2021/0029000 A1* | 1/2021 | Mordani | H04L 41/08 |
| 2021/0097039 A1* | 4/2021 | Denyer | H04L 41/0813 |

FOREIGN PATENT DOCUMENTS

WO 2021011262 A1 1/2021

* cited by examiner

*Primary Examiner* — Umut Onat
(74) *Attorney, Agent, or Firm* — Slater Matsil, LLP (57) ABSTRACT

Examples described herein include automated discovery of hardware resources of nodes of a container cluster to facilitate pod scheduling. According to an example, discovery pods are launched on respective nodes of the container cluster. The discovery pods are privileged pods with an ability to query respective operating systems of respective nodes regarding hardware associated with the respective nodes. Information regarding local block devices associated with the respective nodes are discovered by the discovery pods running thereon. Scheduling of storage system pods on nodes of the container cluster that satisfy storage characteristics specified by respective pod requests are facilitated by creating a raw block persistent volume (PV) for each of the discovered local block devices or a subset thereof.

14 Claims, 6 Drawing Sheets

FACILITATING SCHEDULING OF STORAGE SYSTEM PODS ON NODES OF A CLUSTER BASED ON DISCOVERY OF LOCAL BLOCK DEVICES ASSOCIATED WITH THE NODES

BACKGROUND

Pods and containers are a way of packaging and deploying various services that make up an application. As opposed to a monolithic application in which all functionalities are packaged together as a unified unit within a single program, containerized applications or microservices are generally broken down into a collection of smaller independent units (e.g., designed to be single-purpose specializing in only one job) that carry out application processes as a separate service. A container includes dependencies (e.g., packages, libraries, and binaries) that an application needs to perform its task. As a result, containerized applications can be platform-agnostic and can run directly on any operating system regardless of its version or installed packages, thereby allowing a scheduler associated with a container cluster to freely launch the particular unit of replication (e.g., a container or pod, as the case may be) on any worker node within the container cluster that has a suitable set of information technology (IT) resources.

BRIEF DESCRIPTION OF THE DRAWINGS

Examples described here are illustrated by way of example, and not by way of limitation, in the figures of the accompanying drawings in which like reference numerals refer to similar elements.

DETAILED DESCRIPTION

Examples described herein are generally directed to automated discovery of hardware resources of nodes of a container cluster to facilitate pod scheduling. Numerous specific details are set forth in order to provide a thorough understanding of exemplary aspects. It will be apparent, however, to one skilled in the art that examples described herein may be practiced without some of these specific details.

While the various layers of abstraction within a container cluster save developers the effort of having to tailor different versions of software for different platforms, one tradeoff, due to the inability of the control plane of a container cluster to directly obtain information regarding the underlying physical resources of the worker nodes, is such information needs to be gathered on behalf of the control plane. In some cases, developers manually create a list of hardware resources (e.g., processor cores, memory, disks, etc.) associated with the worker nodes; however, manually keying in such resource information is subject to mistakes. In addition, this approach does not support heterogeneous nodes. While additional lists may be created for different types of worker nodes, it would be helpful to have a more scalable and less error prone approach.

A non-limiting use case in which an automated process for discovering hardware resources of individual worker nodes of a container cluster (e.g., a Kubernetes® cluster) would be useful relates to finding and mounting block devices for use as part of building a data fabric to run a container orchestration system (e.g., Kubernetes®). For example, before prospective data fabric nodes (e.g., a subset of the worker nodes of the container cluster) can be configured to operate as data fabric nodes (by launching storage system pods thereon), raw block persistent volumes (PVs) should be created on the nodes corresponding to discovered local block devices associated with the nodes. The existence of the raw block PVs on various nodes of the cluster then allows the scheduler to take into consideration the storage characteristics of the nodes prior to launching storage system pods and facilitates mounting of the PVs by the storage system pods.

In general, examples described herein seek to address various of the issues noted above by autogenerating information regarding available hardware resources of worker nodes of a container cluster by probing the nodes. According to one example, multiple discovery pods (e.g., in the form of a DaemonSet) may be launched on some subset of the nodes of the container cluster. The discovery pods may be privileged pods that have an ability to query respective operating systems of the respective nodes on which they are launched regarding hardware associated with the respective nodes. In an example block device management implementation, the discovery pods may then call back to the container orchestration system to make the discovered information available for use in creating raw block PVs (e.g., via labels and/or annotations stored within node objects). In another block device management implementation, the discovered information may be first stored by the discovery pods within a shared ConfigMap that may be processed to create a node template that may be reviewed and/or edited by a user before the labelling and/or annotation process and before the raw block PVs are created based thereon. In either case, creation of the raw block PVs on the nodes of the container cluster based on the information regarding the discovered local block devices facilitates scheduling (e.g., by the Kubernetes® scheduler) of storage system pods on those nodes of the container cluster that satisfy storage characteristics specified by respective pod requests.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not necessarily required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one example" or "an example" means that a particular feature, structure, or characteristic described in connection with the example can be included in at least one implementation. The appearances of the phrase "in one example" are not necessarily all referring to the same example.

The terms "component", "module", "system," and the like as used herein are intended to refer to a computer-related entity. Such a component, module, or system may be in the form of a software-executing general-purpose processor, hardware, firmware or a combination thereof. For example, a component may be, but is not limited to being, a process running on a processor, an object, an executable, a thread of execution, a program, and/or a computer. By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
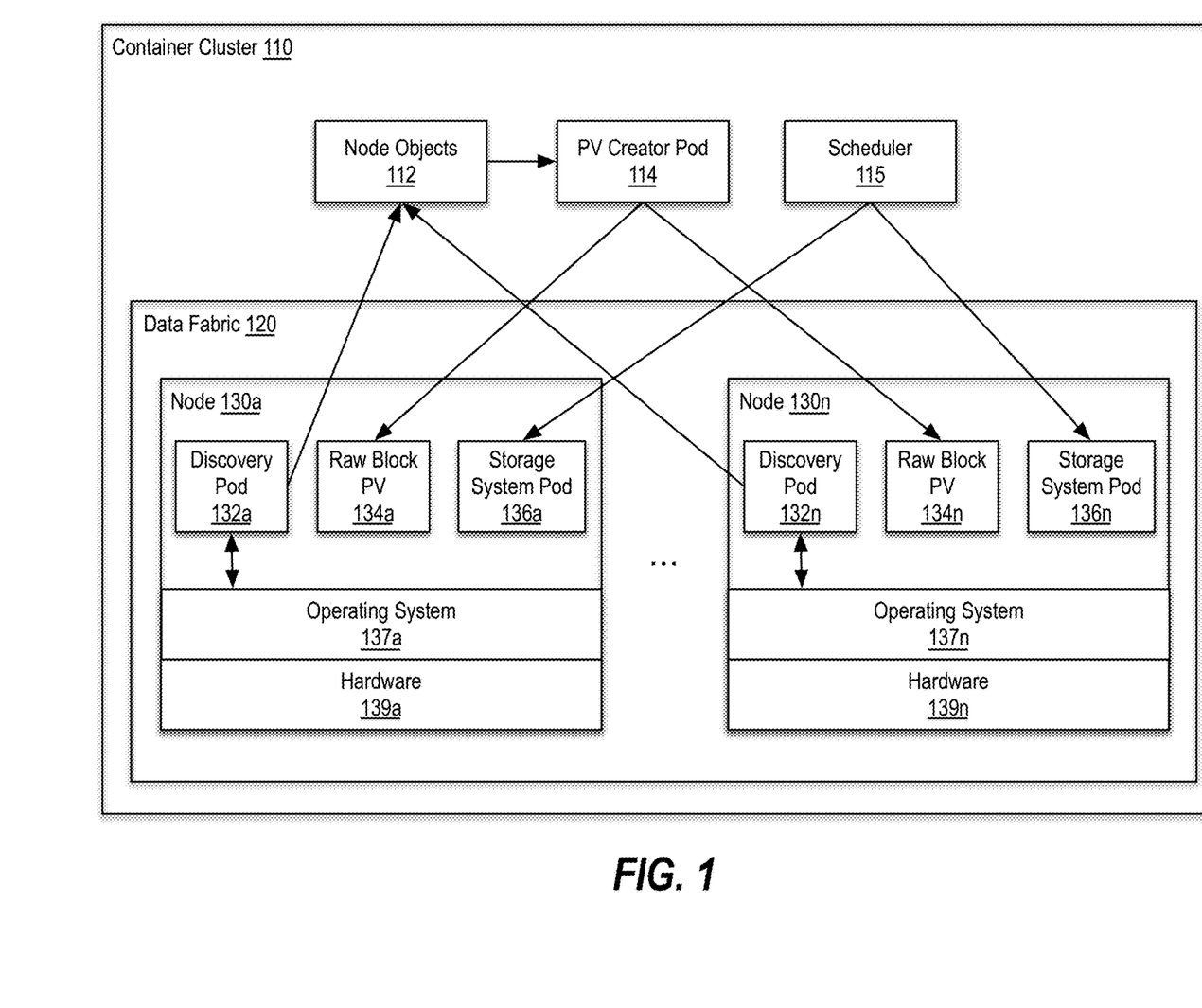
FIG. 1 shows a block diagram conceptually illustrating a container cluster in accordance with a first example.

FIG. 1 shows a block diagram conceptually illustrating a container cluster 110 in accordance with a first example. The particular use case described relates to the creation of a distributed data fabric (e.g., data fabric 120) within the container cluster 110 so as to allow, among other things, the retention of data beyond the lives of the various pods that may create and/or consume the data.

In the context of the present example, the container cluster no (e.g., a Kubernetes® cluster) includes multiple node objects 112, a PV creator pod 114, a scheduler 115 (e.g., the scheduler within the control plane of the Kubernetes® cluster), and multiple prospective data fabric nodes (e.g., worker nodes 130a-n, which may be referred to herein simply as nodes) that may be used to form the distributed data fabric. The distributed data fabric may facilitate automation, curation, and orchestration of data across diverse sources by supporting multiple data types, application programming interfaces (APIs), and ingest mechanisms. For example, the distributed data fabric may provide applications and/or users with the ability to use Hadoop® Distributed File System (HDFS), Network File System (NFS), Container Storage Interface (CSI), Representational State Transfer (REST), and/or Portable Operating System Interface (POSIX)-based APIs, among others.

In this example, the nodes 130a-n are shown with respective discovery pods 132a-n, respective raw block PVs 134a-n, respective storage system pods 136-n, respective operating systems 137a-n, and respective hardware resources (e.g., hardware 139a-n). The nodes 130a-n may be virtual or physical machines (e.g., general purpose computer systems and/or high-speed servers) or a combination thereof. It is to be noted, due to the transient nature of the discovery pods 132a-n, they may or may not run concurrently with the storage system pods 136a-n.

Pertinent to the current use case involving the creation of the distributed data fabric within container cluster 110, the hardware resources of each node may include a number of local block devices (e.g., in the form of Hard Disk Drives (HDDs), Solid State Drives (SSDs), Non-Volatile Memory Express (NVMe) SSDs or HDDs, and the like), which may be used to implement a clustered file system of the data fabric. Before such local block devices can be used by the storage system pods 136a-n (which configure the respective nodes to be operable as data fabric nodes), raw block PVs 134a-n should be created to allow the scheduler 115 to take the storage characteristics of the nodes 130a-n into consideration in connection with determining on which nodes 130a-n the storage system pods 136a-n can be launched. Furthermore, before the raw block PVs can be created, the PV creator pod 114 should be made aware of the local block devices available on each of the nodes 130a-n.

According to one example, the discovery pods 132a-n represent limited-function privileged pods that are capable of querying APIs of respective operating systems 137a-n to obtain desired information regarding all or a subset of hardware resources of the nodes 130a-n. That is, the discovery pods 132a-n have sufficient privileges to invoke at least those of the APIs of the operating systems 137a-n to ascertain relevant information regarding the underlying hardware. For example, in Kubernetes®, privileged mode may be enabled for one or more containers of the discovery pods 132a-n to allow such "privileged" containers to obtain access to all physical devices associated with nodes 130a-n. In this manner, the discovery pods 132a-n may facilitate automated discovery, for example, regarding local block devices of the nodes 130a-n that may be useful in connection with the nodes 130a-n serving as data fabric nodes. The discovery pods 132a-n may label and/or annotate the node objects 112 with the discovered information. A node object 112 may be, for example, a structure for storing data regarding nodes of a cluster. For example, the discovery pods 132a-n may store information regarding the names (e.g., "/dev/sda," "/dev/sdb," etc.), types (e.g., SSD, HDD, NVMe, etc.), and sizes (e.g., storage capacity in gigabytes (GB), terabytes (TB), petabytes (PB), etc.) of the discovered local block devices within the node objects 112 corresponding to nodes 130a-n.

The PV creator pod 114 may be responsible for creating raw block PVs (e.g., raw block PVs 134a-n) on nodes 130a-n corresponding to the discovered local block devices represented within the node objects 112. For example, as described further below with reference to FIG. 2, the PV creator pod 114 may read the information regarding the labeled and annotated nodes from the node objects 112 to create raw block PVs 134a-n.

For its part, the scheduler 115 is responsible for determining on which nodes of the container cluster the storage system pods 136a-n may be launched. As described further below with reference to FIG. 2, pod creation requests for the storage system pods 136a-n may specify certain storage characteristics that are to be met by a node for such pods to be placed on the node. In the context of the present example, node 130a and node 130n have been found to satisfy the requisite storage characteristics, and as such the scheduler 115 has assigned storage system pods 136a and 136n to nodes 130a and 130n, respectively.

While in the present example, two prospective data fabric nodes are shown as having qualified to run storage system pods 136a and 136n, it is to be appreciated that depending upon the provisioned hardware resources, more or fewer of the nodes 130a-n may be configured as data fabric nodes of the data fabric.

Figure 2:
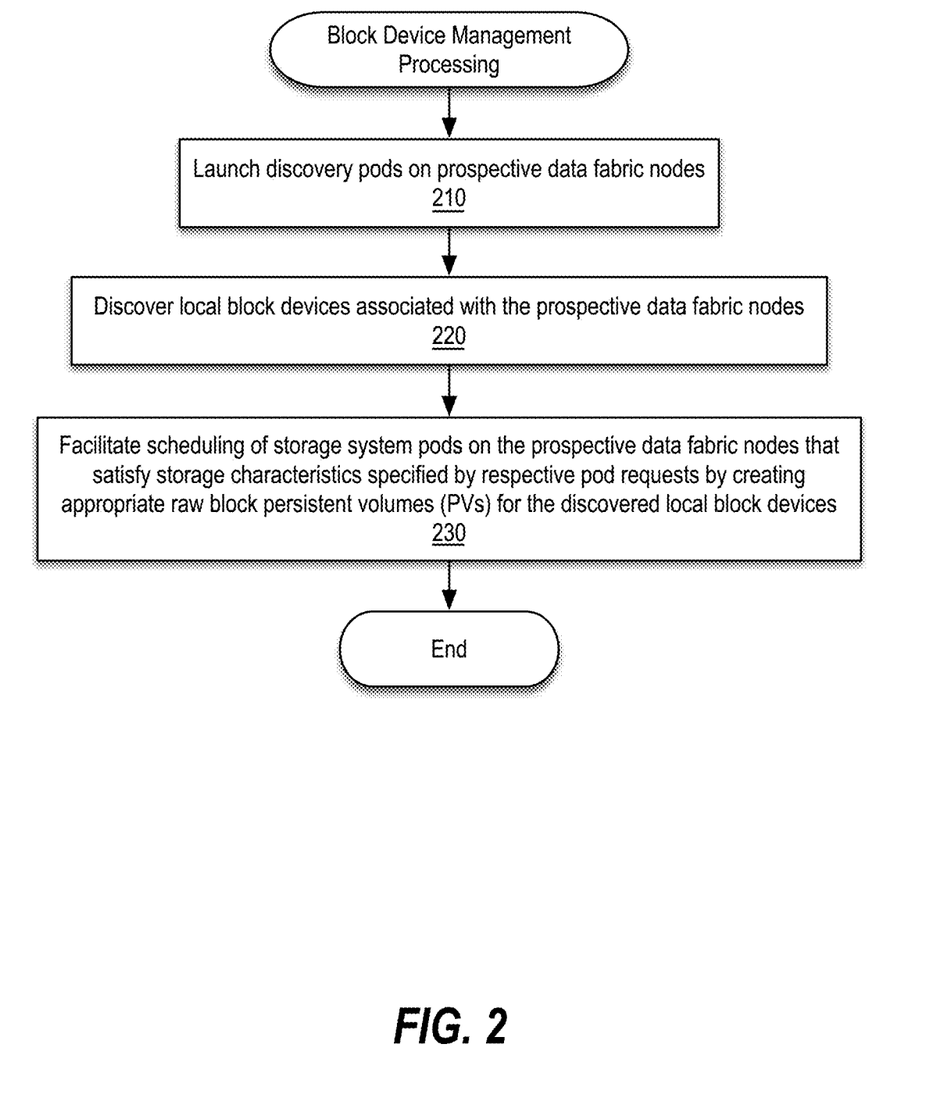
FIG. 2 shows a flow diagram illustrating block device management processing in accordance with the first example.

FIG. 2 shows a flow diagram illustrating block device management processing in accordance with the first example. In this block device management approach, raw block PVs (e.g., raw block PVs 134a-n) may be created on prospective data fabric nodes (e.g., nodes 130a-n) based on autogenerated discovery information acquired during probing of the nodes and without any user involvement.

At block 210, discovery pods (e.g., discovery pods 132a-n) are launched on prospective data fabric nodes. In one example, the discovery pods represent a DaemonSet. An administrator may have created the DaemonSet, for example, by submitting a YAML file to the container cluster (e.g., container cluster 110) or calling a REST API of the container cluster. DaemonSets attempt to adhere to a one-pod-per node model, across an entire cluster or a subset of the nodes of the cluster. In this manner, all eligible nodes (e.g., the prospective data fabric nodes) can be ensured to run a copy of a particular type of pod.

At block 220, the discovery pods discover local block devices associated with the prospective data fabric nodes. According to one aspect, the discovery pods are "privileged" pods with privileged mode enabled for one or more containers thereof to facilitate gathering of information regarding local block devices associated with the prospective data fabric nodes. The discovery pods may discover desired information relating to the local block devices, for example, by interrogating APIs of the operating system (e.g., operating system 127a-n) of the prospective data fabric nodes on which they are launched. After performing their respective discovery function, the discovery pods may call back out the container cluster to identify what types and sizes of disks are present on the nodes by, for example, labelling, annotating, and/or tainting the nodes by way of corresponding node objects (e.g., node objects 212).

At block 230, scheduling of storage system pods (e.g., storage system pods 136a-n) on the prospective data fabric nodes by a scheduler (e.g., scheduler 115) of the container cluster is facilitated by creating raw block PVs on the prospective data fabric nodes. For example, a PV creator pod (e.g., PV creator pod 114) may create the appropriate raw block PVs based on the information discovered by the discovery pods and stored within the node objects. The presence of the raw block PVs in turn allows the scheduler to determine which of the prospective data fabric nodes satisfy storage characteristics specified by respective storage system pod creation requests. In one example, storage system pods may be scheduled to run on prospective data fabric nodes meeting certain minimum resource requirements. For example, minimum criteria for a node to serve as a data fabric node may include the node having three local block devices each having 500 GB of storage space.

In this manner, the discovery pods 132a-n may facilitate automated discovery, for example, regarding local block devices of the nodes 130a-n that may be useful in connection with the nodes 130a-n serving as data fabric nodes.

Figure 3:
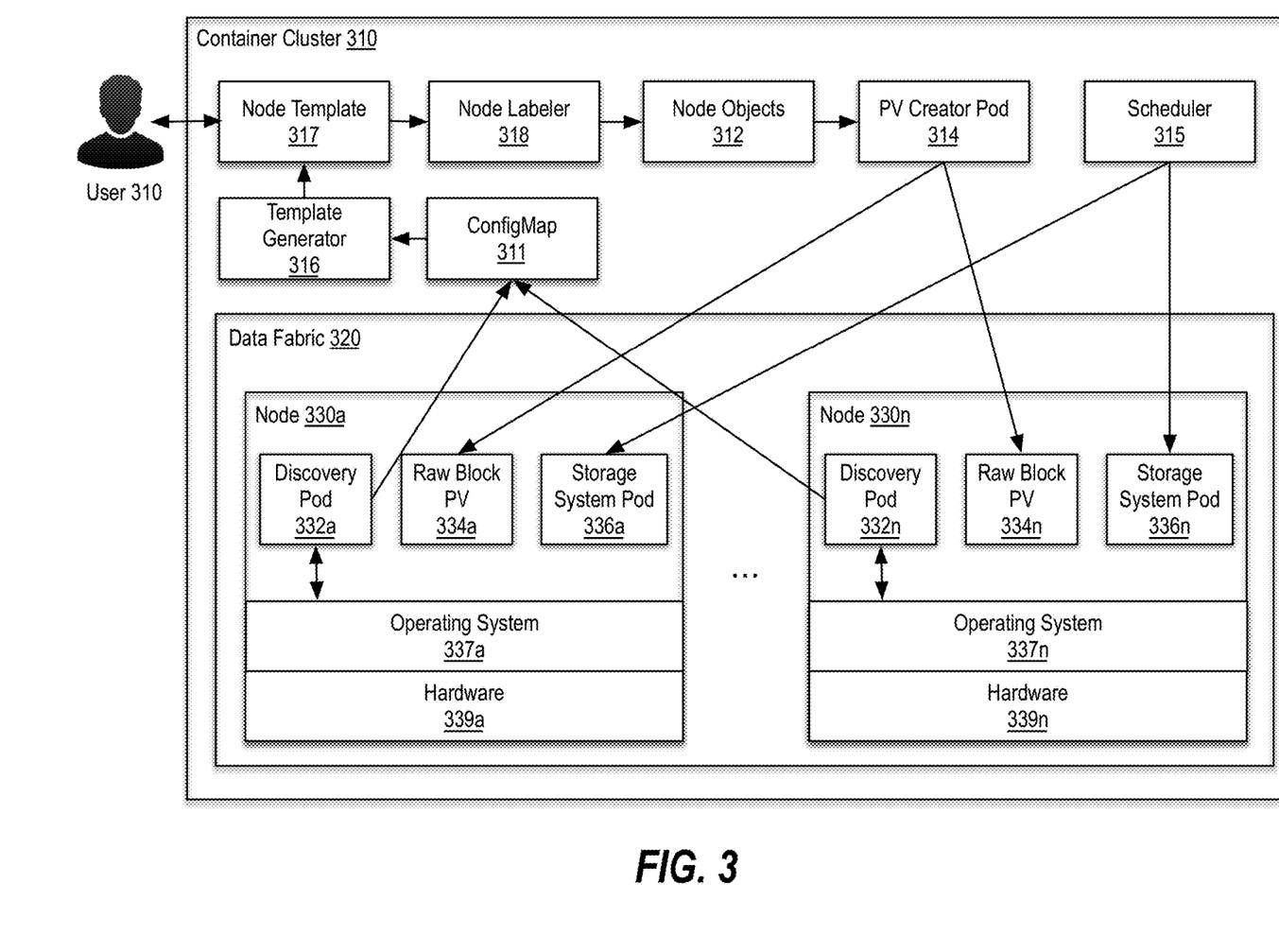
FIG. 3 shows a block diagram conceptually illustrating a container cluster in accordance with a second example.

FIG. 3 shows a block diagram conceptually illustrating a container cluster 310 in accordance with a second example. This second example relates to a particular use case involving a block device management approach in which a user is provided an opportunity to influence the node labeling process and the downstream creation of PVs.

As described above with reference to FIG. 1, the container cluster 310 (e.g., a Kubernetes® cluster) includes multiple node objects 312, a PV creator pod 314, a scheduler 315 (e.g., the scheduler within the control plane of the Kubernetes® cluster), and multiple prospective data fabric nodes (e.g., worker nodes 330a-n) that may be used to form a distributed data fabric 32o. However, in the context of the present example, container cluster 310 also additionally includes a shared configuration map (e.g., ConfigMap 311), a template generator 316, a node template 317, and a node labeler 318. As the general functionality of node objects 312, the PV creator pod 314, the scheduler 315, the data fabric 32o, the nodes 330a-n, the discovery pods 332a-n, the raw block PVs 334a-n, the storage system pods 336a-n, operating systems 337a-n, and hardware 339a-n may be as described with reference to the corresponding (i.e., similarly named) entities in FIG. 1, for purposes of brevity, only those entities (i.e., the share configuration map, the template generator 316, the node template 317, and the node labeler 318) not shown in FIG. 1 will be described in connection with FIG. 3.

In this example, the discovery pods 332a-n may use the shared configuration map as the repository for persisting the information discovered regarding local hardware resources of the respective nodes. The template generator 316 may be responsible for reading the shared configuration map and creating node templates (e.g., the node template 317), for example, in a form of a human-readable data-serialization language (e.g., YAML Ain't Markup Language (YAML), extensible markup language (XML), or the like). This allows a user (e.g., user 310) an opportunity to review and/or edit the node templates (e.g., to add or remove block devices, to preclude a particular node having a raw block PV launched thereon, etc.) prior to creation of the raw block PVs 334a-n by the PV creator pod 314.

The node labeler 318 may be responsible for reading node templates (e.g., node template 317) and labelling and/or annotating the nodes via corresponding node objects 312.

While not shown, those skilled in the art will appreciate the various pods described with reference to FIGS. 1 and 3 are running on one or more nodes (not shown) of the container cluster 110 or 310. For example, such services may be running on the same or different nodes.

Figure 4:
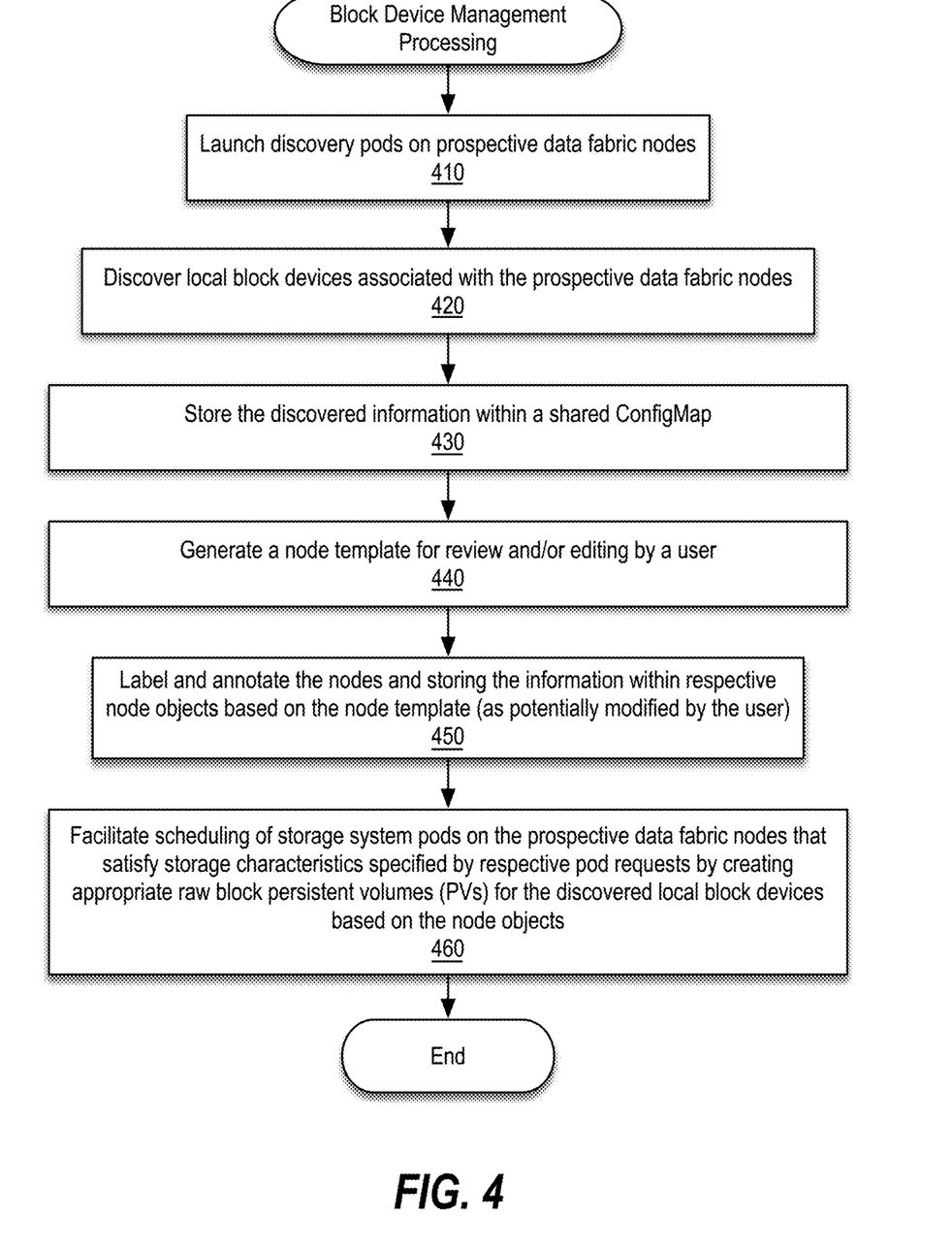
FIG. 4 shows a flow diagram illustrating block device management processing in accordance with the second example.

FIG. 4 shows a flow diagram illustrating block device management processing in accordance with the second example. In this block device management approach, raw block PVs (e.g., raw block PVs 134a-n) may be created on prospective data fabric nodes (e.g., nodes 130a-n) based on autogenerated discovery information acquired during probing of the nodes after giving a user an opportunity to review and/or edit node templates (e.g., node template 317).

At block 410, discovery pods (e.g., discovery pods 332a-n) are launched on prospective data fabric nodes. As noted above, in one example, the discovery pods represent a DaemonSet.

At block 420, the discovery pods discover local block devices associated with the prospective data fabric nodes. As noted above, in one example, the discovery pods are "privileged" pods with privileged mode enabled for one or more containers thereof to facilitate gathering of information regarding local block devices associated with the prospective data fabric nodes. The discovery pods may discover information relating to the local block devices, for example, by querying the operating system (e.g., operating system 327a-n) of the prospective data fabric nodes on which they are launched via APIs of the operating system.

At block 430, responsive to obtaining the discovery information, the discovery pods may call back out the container cluster (e.g., container cluster 310) to identify what types and sizes of disks are present on the nodes by, for example, storing the information within a shared configuration map (e.g., ConfigMap 311).

At block 440, a node template may be generated for review and/or editing by a user (e.g., user 310). For example, the user may be given an opportunity to influence the raw block PV creation process by adding or removing local block devices from the node template (e.g., node template 317). Additionally, after the user has edited the node template, the node template may be validated to ensure the names and/or types of the local block devices in the node template are accurate.

At block 450, the nodes may be labeled and/or annotated. In one example, based on the node templates (e.g., node template 317), a node labeler (e.g., node labeler 218) may identify what types and sizes of disks are present on the nodes by, labelling, annotating, and/or tainting the nodes by way of corresponding node objects (e.g., node objects 312).

At block 460, scheduling of storage system pods (e.g., storage system pods 136*a-n*) on the prospective data fabric nodes by a scheduler (e.g., scheduler 115) of the container cluster (e.g., container cluster 310) is facilitated by creating raw block PVs on the prospective data fabric nodes. For example, a PV creator pod (e.g., PV creator pod 314) may create the appropriate raw block PVs based on the information stored within the node objects (e.g., as discovered by the discovery pods and as potentially edited by the user). The presence of the raw block PVs, then allows the scheduler to determine which of the prospective data fabric nodes satisfy storage characteristics specified by respective storage system pod creation requests. In one example, storage system pods may be scheduled to run on prospective data fabric nodes meeting certain minimum resource requirements. For example, minimum criteria for a node to serve as a data fabric node may include the node having X local block devices each having storage capacity of Y.

The various pods (e.g., PV creator pod, discovery pods, and storage system pods) and other components described with reference to FIG. 1 and with reference to FIG. 3 (e.g., node labeler, template generator) and the processing described with reference to the flow diagrams of FIGS. 2 and 4 may be implemented in the form of executable instructions stored on a machine readable medium and executed by a hardware-based processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more computer systems of various forms (e.g., servers, blades, desktop computers, laptop computers), such as the computer systems described with reference to FIGS. 5-6 below.

Figure 5:
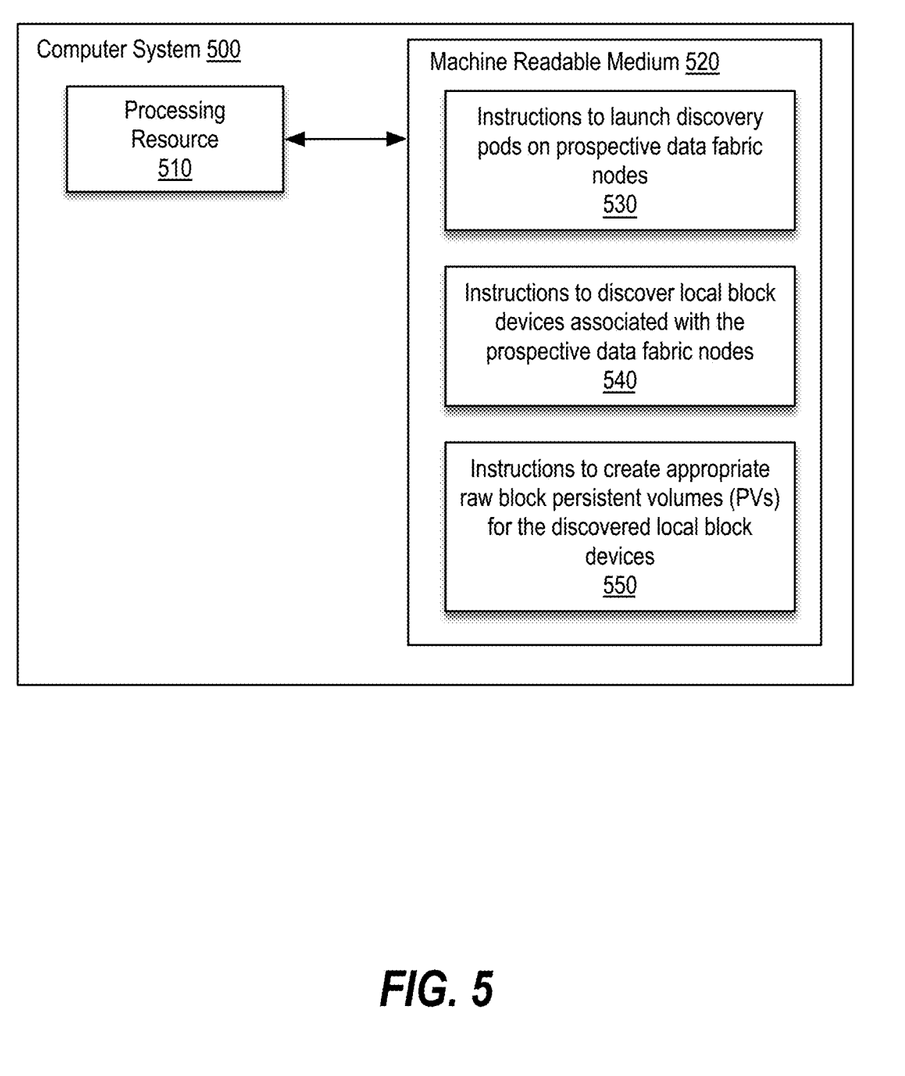
FIG. 5 shows a block diagram of a computer system in accordance with the first example.

FIG. 5 shows a block diagram of a computer system in accordance with the first example. In the example illustrated by FIG. 5, computer system 500 includes processing resource 510 coupled to non-transitory, machine readable medium 520 encoded with instructions to perform one or more processes described herein Processing resource 510 may include a microcontroller, a microprocessor, CPU core(s), GPU core(s), an ASIC, an FPGA, and/or other hardware device suitable for retrieval and/or execution of instructions from machine readable medium 520 to perform the functions related to various examples described herein. Additionally or alternatively, processing resource 510 may include electronic circuitry for performing the functionality of the instructions described herein.

Machine readable medium 520 may be any tangible medium suitable for storing executable instructions. Non-limiting examples of machine readable medium 520 include RAM, ROM, EEPROM, flash memory, a hard disk drive, an optical disc, or the like. Machine readable medium 520 may be disposed within computer system 500, as shown in FIG. 5, in which case the executable instructions may be deemed "installed" or "embedded" on computer system 500. Alternatively, machine readable medium 520 may be a portable (e.g., external) storage medium, and may be part of an "installation package." The instructions stored on machine readable medium 520 may be useful for implementing at least part one or more of the methods described herein.

In the context of the present example, machine readable medium 520 is encoded with a set of executable instructions 530-560. It should be understood that part or all of the executable instructions and/or electronic circuits included within one block may, in alternate implementations, be included in a different block shown in the figures or in a different block not shown.

Instructions 530, upon execution, may cause processing resource 510 to launch discovery pods (e.g., discovery pods 132*a-n*) on prospective data fabric nodes (e.g., nodes 130*a-n*). In one example, instructions 530 may be useful for performing block 210 of FIG. 2.

Instructions 540, upon execution, may cause processing resource 510 to discover local block devices associated with the prospective data fabric nodes. In one example, instructions 540 may be useful for performing block 220 of FIG. 2.

Instructions 550, upon execution, may cause processing resource 510 to create appropriate raw block PVs (e.g., raw block PVs 134*a-n*) for the discovered local block devices. In one example, instructions 550 may be useful for performing block 230 of FIG. 2.

Figure 6:
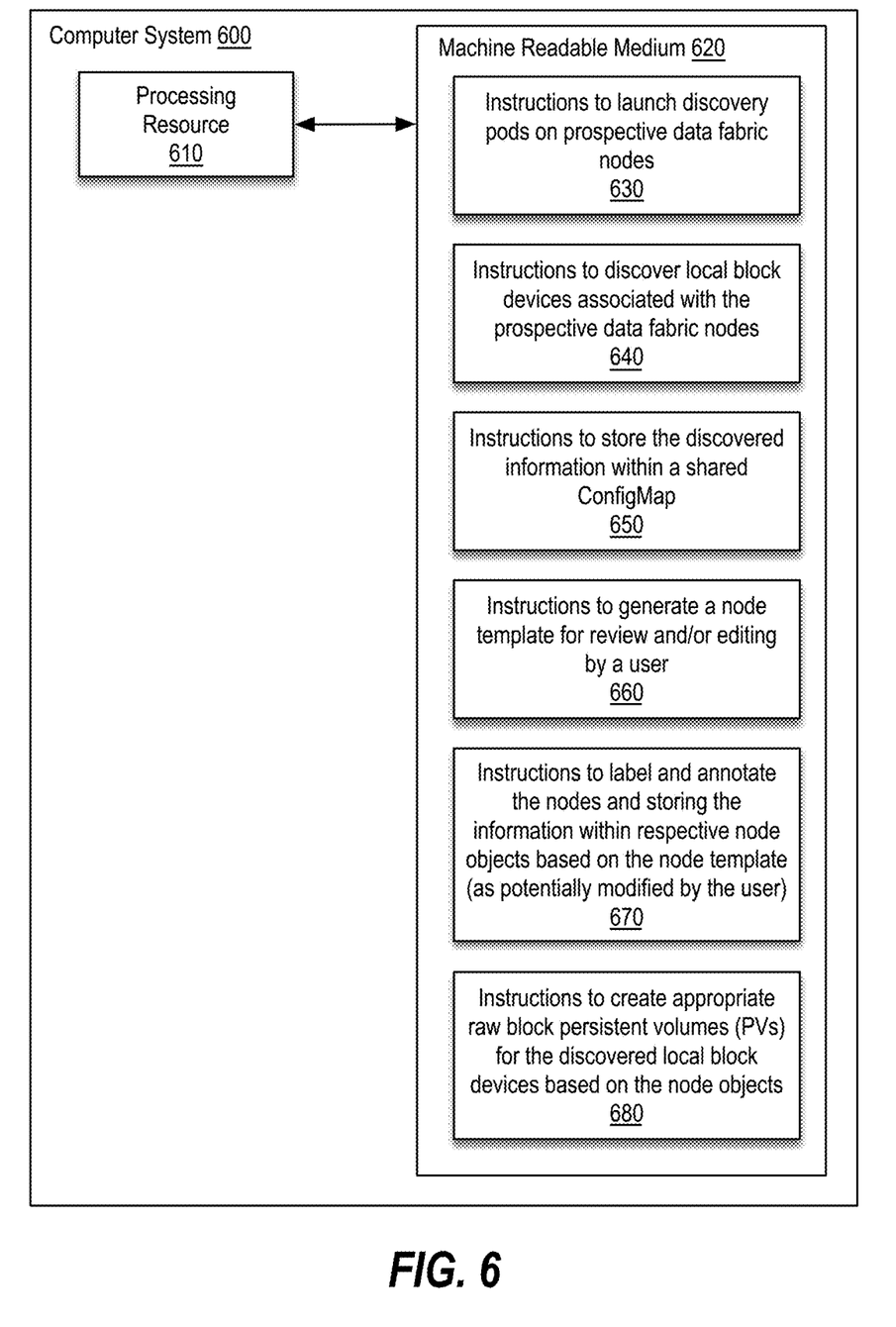
FIG. 6 shows a block diagram of a computer system in accordance with the second example.

FIG. 6 shows a block diagram of a computer system in accordance with the second example. In the example illustrated by FIG. 6, computer system 600 includes a processing resource 610 coupled to a non-transitory, machine readable medium 620 encoded with instructions to perform one or more processes described herein. As above, the processing resource 610 may include a microcontroller, a microprocessor, central processing unit core(s), an ASIC, an FPGA, and/or other hardware device suitable for retrieval and/or execution of instructions from the machine readable medium 620 to perform the functions related to various examples described herein. Additionally or alternatively, the processing resource 610 may include electronic circuitry for performing the functionality of the instructions described herein.

The machine readable medium 620 may be any tangible medium suitable for storing executable instructions. Non-limiting examples of machine readable medium 620 include RAM, ROM, EEPROM, flash memory, a hard disk drive, an optical disc, or the like. The machine readable medium 620 may be disposed within the computer system 600, as shown in FIG. 6, in which case the executable instructions may be deemed "installed" or "embedded" on the computer system 600. Alternatively, the machine readable medium 620 may be a portable (e.g., external) storage medium, and may be part of an "installation package." The instructions stored on the machine readable medium 620 may be useful for implementing at least part of the methods described herein.

In the context of the present example, the machine readable medium 620 is encoded with a set of executable instructions 630-680. It should be understood that part or all of the executable instructions and/or electronic circuits included within one block may, in alternate implementations, be included in a different block shown in the figures or in a different block not shown. For example, in one aspect, the set of executable instructions 530-550 of FIG. 5 and the set of executable instructions 630-680 may be installed on the same computer system.

Instructions 630, upon execution, may cause the processing resource 610 to launch discovery pods (e.g., discovery pods 332a-n) on prospective data fabric nodes (e.g., nodes 330a-n). In one example, instructions 630 may be useful for performing block 410 of FIG. 4.

Instructions 640, upon execution, may cause the processing resource 610 to discover local block devices associated with the prospective data fabric nodes. In one example, instructions 640 may be useful for performing block 420 of FIG. 4.

Instructions 650, upon execution, may cause the processing resource 610 to store the discovered information within a shared configuration map (e.g., Config Map 311). In one example, instructions 650 may be useful for performing block 430 of FIG. 4.

Instructions 660, upon execution, may cause the processing resource 610 to generate a node template (e.g., node template 317) for review and/or editing by a user (e.g., user 310). In one example, instructions 660 may be useful for performing decision block 440 of FIG. 4.

Instructions 670, upon execution, may cause the processing resource 610 to label and annotate the nodes and store the information within respective node objects (e.g., node objects 312) based on the node template (as potentially modified by the user). In one example, instructions 670 may be useful for performing block 450 of FIG. 4.

Instructions 680, upon execution, may cause the processing resource 610 to create appropriate raw block PVs (e.g., raw block PVs 334a-n) for the discovered local block devices based on the node objects. In one example, instructions 680 may be useful for performing block 460 of FIG. 4.

In the foregoing description, numerous details are set forth to provide an understanding of the subject matter disclosed herein. However, implementation may be practiced without some or all of these details. Other implementations may include modifications, combinations, and variations of the details discussed above. It is intended that the following claims cover such modifications, combinations, and variations.

What is claimed is:

1. A method comprising:
launching a plurality of discovery pods on a plurality of nodes of a container cluster, wherein the plurality of discovery pods are privileged pods with an ability to query respective operating systems of respective nodes regarding hardware associated with the respective nodes;
discovering local block devices associated with each of the plurality of nodes by respective discovery pods of the plurality of discovery pods;
providing a user an opportunity to review and edit a list of the discovered local block devices for a particular node of the plurality of nodes prior to creating a raw block persistent volume (PV) for each of the discovered local block devices or a subset thereof, wherein the list of the discovered local block devices is accessible to the user via a node template in a form of a human-readable data-serialization language; and
facilitating scheduling of storage system pods on nodes of the plurality of nodes that satisfy storage characteristics specified by respective pod requests by creating the raw block PV for each of the discovered local block devices or the subset thereof.

2. The method of claim 1, further comprising causing information regarding a name, a type, and a size of the discovered local block devices to be stored within respective node objects corresponding to the plurality of nodes for use by a PV creator pod in connection with said creating the raw block PV for each of the discovered local block devices.

3. The method of claim 1, further comprising storing, by the plurality of discovery pods, information regarding a name, a type, and a size of the discovered local block devices within a shared configuration map.

4. The method of claim 1, wherein the node template is created by a node template generator based on a shared configuration map to which the plurality of discovery pods store information collected from respective nodes of the plurality of nodes during the discovering of the local block devices.

5. The method of claim 1, wherein the scheduling of the storage system pods on the nodes of the plurality of nodes is performed in connection with building a distributed data fabric within the container cluster.

6. A system comprising:
a processing resource; and
a non-transitory computer-readable medium, coupled to the processing resource, having stored therein instructions that when executed by the processing resource cause the processing resource to:
launch a plurality of discovery pods on a plurality of nodes of a container cluster, wherein the plurality of discovery pods are privileged pods with an ability to query respective operating systems of respective nodes regarding hardware associated with the respective nodes;
discover local block devices associated with each of the plurality of nodes by respective discovery pods of the plurality of discovery pods;
provide a user an opportunity to review and edit a list of the discovered local block devices for a particular node of the plurality of nodes prior to creating a raw block persistent volume (PV) for each of the discovered local block devices or a subset thereof, wherein the list of the discovered local block devices is accessible to the user via a node template in a form of a human-readable data-serialization language; and
facilitate scheduling of storage system pods on nodes of the plurality of nodes that satisfy storage characteristics specified by respective pod requests by creating the raw block PV for each of the discovered local block devices or the subset thereof.

7. The system of claim 6, wherein the instructions further cause the processing resource to store information regarding a name, a type, and a size of the discovered local block devices within respective node objects corresponding to the plurality of nodes for use by a PV creator pod in connection with said creating the raw block PV for each of the discovered local block devices.

8. The system of claim 6, wherein the instructions further cause the processing resource to store, by the plurality of discovery pods, information regarding a name, a type, and a size of the discovered local block devices within a shared configuration map.

9. The system of claim 6, wherein the node template is created by a node template generator based on a shared configuration map to which the plurality of discovery pods store information collected from respective nodes of the plurality of nodes during the discovery of the local block devices.

10. The system of claim 6, wherein the scheduling of the storage system pods on the nodes of the plurality of nodes is performed in connection with building a data fabric to run within the container cluster.

11. A non-transitory machine readable medium storing instructions, which when executed by a processing resource of a computer system, cause the processing resource to:
- launch a discovery pod on a node of a plurality of nodes of a container cluster, wherein the discovery pod is a privileged pod with an ability to query an operating system of the node regarding hardware associated with the node;
- discover local block devices associated with the node by the discovery pod;
- provide a user an opportunity to review and edit a list of the discovered local block devices prior to creating a raw block persistent volume (PV) for each of the discovered local block devices or a subset thereof, wherein the list of the discovered local block devices is accessible to the user via a node template in a form of a human-readable data-serialization language; and
- cause a scheduler associated with the container cluster, as part of determining by the scheduler on which of the plurality of nodes to launch a storage system pod based at least in part on their respective ability to satisfy storage characteristics specified by respective pod requests, to take into consideration the discovered local block devices by creating the raw block PV for each of the discovered local block devices or the subset thereof.

12. The non-transitory machine readable medium of claim 11, wherein the instructions further cause the processing resource to store information regarding a name, a type, and a size of the discovered local block devices within a node object corresponding to the node for use by a PV creator pod in connection with said creating the raw block PV for each of the discovered local block devices or the subset thereof.

13. The non-transitory machine readable medium of claim 11, wherein the instructions further cause the processing resource to store, by the discovery pod, information regarding a name, a type, and a size of the discovered local block devices within a shared configuration map.

14. The non-transitory machine readable medium of claim 11, wherein the node template is created by a node template generator based on a shared configuration map to the discovery pod stores information collected from the node during the discovery of the local block devices.

* * * * *